(12) United States Patent
Igami et al.

(10) Patent No.: US 6,622,223 B2
(45) Date of Patent: Sep. 16, 2003

(54) INFORMATION RECORDING AND REPRODUCTION APPARATUS, INFORMATION RECORDING AND REPRODUCTION METHOD AND INFORMATION SIGNAL SOURCE

(75) Inventors: Eiichi Igami, Kyoto (JP); Kenji Takauchi, Osaka (JP); Hiroshi Ueda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 116 days.

(21) Appl. No.: 09/823,784

(22) Filed: Mar. 30, 2001

(65) Prior Publication Data
US 2001/0036112 A1 Nov. 1, 2001

(30) Foreign Application Priority Data
Mar. 31, 2000 (JP) .................................. 2000-099789
Mar. 31, 2000 (JP) .................................. 2000-099790

(51) Int. Cl.[7] ........................ G06F 12/14; G06F 13/14
(52) U.S. Cl. ........................ 711/156; 711/111; 711/163
(58) Field of Search ........................ 711/111, 112, 154, 711/156, 163; 713/100

(56) References Cited

U.S. PATENT DOCUMENTS 5,778,444 A * 7/1998 Langan et al. ............ 711/163
6,073,243 A * 6/2000 Dalvi et al. ................ 713/202

FOREIGN PATENT DOCUMENTS

| JP | 06-296327 | 11/1994 |
| JP | 06-325721 | 12/1994 |
| JP | 07-073022 | 3/1995 |

\* cited by examiner

*Primary Examiner*—Gary Portka
(74) *Attorney, Agent, or Firm*—Snell & Wilmer, LLP

(57) ABSTRACT

An information recording and reproduction apparatus comprises a recording and reproduction section for recording to, or reproducing from, an information medium, an information signal, a recording and reproduction control section for controlling the recording and reproduction section based on a control parameter, an interface connected to an information signal source, the information signal source being adapted to provide a permission to update the control parameter, a forbidden flag section including a forbidden flag indicating the presence or absence of a permission to update the control parameter, the information signal source being operative to set the forbidden flag, and a control parameter update section for updating the control parameter. The control parameter update section is adapted to update the control parameter in accordance with a permission to perform updating from the information signal source when the forbidden flag has been set by the information signal source. The recording and reproduction control section is adapted to control the recording and reproduction section based on the control parameter updated by the control parameter update section.

14 Claims, 12 Drawing Sheets

FIG.2

|  | Temperature | | |
| --- | --- | --- | --- |
|  | T1 | T2 | T3 |
| 131 — Focus position control parameter | P11 | P12 | P13 |
| 132 — Circuit offset parameter | P21 | P22 | P23 |
| 133 — Laser output control parameter | P31 | P32 | P33 |

Information recording and reproduction apparatus 100A side

Information recording and reproduction apparatus 100B side

INFORMATION RECORDING AND REPRODUCTION APPARATUS, INFORMATION RECORDING AND REPRODUCTION METHOD AND INFORMATION SIGNAL SOURCE

BACKGROUND OF THE INVENTION

1. Field of the Invention

The present invention relates to an information recording and reproduction apparatus, an information signal source and an information recording and reproduction method.

2. Description of the Related Art

The term "learning" herein means that an optimal value of a control parameter is obtained by evaluating recording and reproduction performances while changing the control parameter. An information recording and reproduction apparatus includes a recording and reproduction section for recording and reproducing an information signal to and from an information medium, an interface connected to an information signal source, a buffer memory connected to the interface and used to temporarily store an information signal, and a control parameter update section for updating a control parameter based on an optimal value obtained by learning. The information recording and reproduction apparatus further includes a recording and reproduction control section for controlling the recording and reproduction section based on the control parameter updated by the control parameter update section. A host system (the information signal source) includes a buffer memory for temporarily storing an information signal to be transferred to the information recording and reproduction apparatus.

Japanese Laid-open Publication No. 8-153348 discloses an optical recording apparatus in which an optimal value of a parameter for writing or reproducing data to or from a magneto-optical disk is obtained with reference to a correction table and parameter table.

Japanese Laid-open Publication No. 8-180621 discloses an off-track correction method and an information recording and reproduction apparatus for performing learning based on a change in temperature during execution of a command.

The above-described conventional information recording and reproduction apparatuses perform learning, and update control parameters when temperature is transitioned to a predetermined value or more.

During a time when learning for updating a control parameter is performed, the recording and reproduction section cannot record or reproduce an information signal to or from an information medium. If an information signal cannot be recorded in an information medium during learning, an information signal from the host system (information signal source) is transferred to the buffer memory. The buffer memory of the information recording and reproduction apparatus may become full, and then the buffer memory of the host system may become full. In this case, the transfer of an information signal from the host system (information signal source) to the information recording and reproduction apparatus is stopped.

SUMMARY OF THE INVENTION

According to one aspect of the present invention, an information recording and reproduction apparatus comprises a recording and reproduction section for recording to, or reproducing from, an information medium, an information signal, a recording and reproduction control section for controlling the recording and reproduction section based on a control parameter, an interface connected to an information signal source, the information signal source being adapted to provide a permission to update the control parameter, a forbidden flag section including a forbidden flag indicating the presence or absence of a permission to update the control parameter, the information signal source being operative to set the forbidden flag, and a control parameter update section for updating the control parameter. The control parameter update section is adapted to update the control parameter in accordance with a permission to perform updating from the information signal source when the forbidden flag has been set by the information signal source. The recording and reproduction control section is adapted to control the recording and reproduction section based on the control parameter updated by the control parameter update section.

In one embodiment of this invention, the information recording and reproduction apparatus further comprises a first buffer memory connected to the interface and used to temporarily store the information signal, and a first buffer memory space detection section for detecting a space of the first buffer memory. The control parameter update section is adapted to update the control parameter based on the space detected by the first buffer memory space detection section when the forbidden flag has not been set by the information signal source.

In one embodiment of this invention, the information recording and reproduction apparatus further comprises a temperature detection section for detecting an ambient temperature of the recording and reproduction section. The control parameter update section is adapted to update the control parameter based on the ambient temperature detected by the temperature detection section when the forbidden flag has not been set by the information signal source.

In one embodiment of this invention, the information recording and reproduction apparatus further comprises an update flag section including an update request flag indicating the presence or absence of a request to the information signal source to update the control parameter, and an update permission flag indicating the presence or absence of a permission from the information signal source, in response to the request, to update the control parameter. The control parameter update section is adapted to set the update request flag, and thereafter update the control parameter when the update permission flag has been set by the information signal source. The recording and reproduction control section is adapted to control the recording and reproduction section based on the control parameter updated by the control parameter update section.

In one embodiment of this invention, the information recording and reproduction apparatus further comprises a temperature detection section for detecting an ambient temperature of the recording and reproduction section. The control parameter update section is adapted to set the update request flag based on the ambient temperature detected by the temperature detection section.

In one embodiment of this invention, the information signal source includes at least one of a forbidden flag control section for setting the forbidden flag and a second buffer memory space detection section for detecting a space of a second buffer memory included in the information signal source. The second buffer memory temporality stores the information signal.

According to another aspect of the present invention, an information signal source connected to the information recording and reproduction apparatus, comprises a second buffer memory for temporarily storing the information signal, at least one of a second buffer memory space detection section for detecting a space of the second buffer memory and a forbidden flag control section for setting the forbidden flag, and an update permission flag control section for setting the update permission flag based on a predetermined condition.

According to another aspect of the present invention, an information recording and reproduction method for recording and reproducing an information signal using the information recording and reproduction apparatus, comprises a) detecting that the forbidden flag has been set, and b) updating the control parameter in accordance with the permission to perform updating from the information signal source when it is detected in step a) that the forbidden flag has been set.

According to another aspect of the present invention, an information recording and reproduction method for recording and reproducing an information signal using the information recording and reproduction apparatus, comprises a) detecting that the forbidden flag has been set, b) detecting a space of the first buffer memory, and c) updating the control parameter based on the space detected in step b) when it is detected in step a) that the forbidden flag has not been set.

According to another aspect of the present invention, an information recording and reproduction method for recording and reproducing an information signal using the information recording and reproduction apparatus, comprises a) detecting that the forbidden flag has been set, b) detecting a space of the first buffer memory, and c) detecting an ambient temperature of the recording and reproduction section based on the space detected in step b), d) updating the control parameter based on the ambient temperature detected in step c) when it is detected in step a) that the forbidden flag has not been set.

According to another aspect of the present invention, an information recording and reproduction method for recording and reproducing an information signal using the information recording and reproduction apparatus, comprises a) detecting that the forbidden flag has been set, b) detecting an ambient temperature of the recording and reproduction section, c) detecting a space of the first buffer memory based on the ambient temperature detected in step b), and d) updating the control parameter based on the space detected in step c) when it is detected in step a) that the forbidden flag has not been set.

According to another aspect of the present invention, an information recording and reproduction method for recording and reproducing an information signal using an information recording and reproduction apparatus, comprises a) detecting that the forbidden flag has been set, b) setting the update request flag when it is detected in step a) that the forbidden flag has been set, c) updating the control parameter when the update permission flag has been set by the information signal source, and d) clearing the update request flag after step c).

According to another aspect of the present invention, an information recording and reproduction method for recording and reproducing an information signal using the information recording and reproduction apparatus, comprises a) detecting that the forbidden flag has been set, b) detecting an ambient temperature of the recording and reproduction section, c) setting the update request flag based on the ambient temperature detected in step b) when it is detected in step a) that the forbidden flag has been set, d) updating the control parameter when the update permission flag has been set by the information signal source, and e) clearing the update request flag after step d).

According to another aspect of the present invention, an information recording and reproduction method for recording and reproducing an information signal using the information recording and reproduction apparatus and the information signal source, comprises a) setting the forbidden flag, b) detecting that the update request flag has been set, when the forbidden flag has been set in step a), c) detecting a space of the second buffer memory when it is detected in step b) that the update request flag has been set, d) setting the update permission flag based on the space of the second buffer memory detected in step c), and e) clearing the update permission flag when it is detected in step b) that the update request flag has not been set.

Thus, the invention described herein makes possible the advantages of providing: (1) an information recording and reproduction apparatus, an information signal source and an information recording and reproduction method which can perform highly-reliable recording and reproduction; (2) an information recording and reproduction apparatus, an information signal source and an information recording and reproduction method which can continuously transfer an information signal between the information recording and reproduction apparatus and a host system (information signal source); (3) an information recording and reproduction apparatus, an information signal source and an information recording and reproduction method which can continuously transfer an information signal between the information recording and reproduction apparatus and a host system (information signal source) while performing learning for updating a control parameter; and (4) an information recording and reproduction apparatus, an information signal source and an information recording and reproduction method which can request to a host system (information signal source) a permission to perform learning for updating a control parameter, and can perform learning under a control of the host system (information signal source).

These and other advantages of the present invention will become apparent to those skilled in the art upon reading and understanding the following detailed description with reference to the accompanying figures.

BRIEF DESCRIPTION OF THE DRAWINGS

FIG. 2 is a diagram used for explaining a control parameter table of Example 1 of the present invention.

DESCRIPTION OF THE PREFERRED EMBODIMENTS

Hereinafter, the present invention will be described by way of illustrative examples with reference to the accompanying drawings.

EXAMPLE 1

Figure 1:
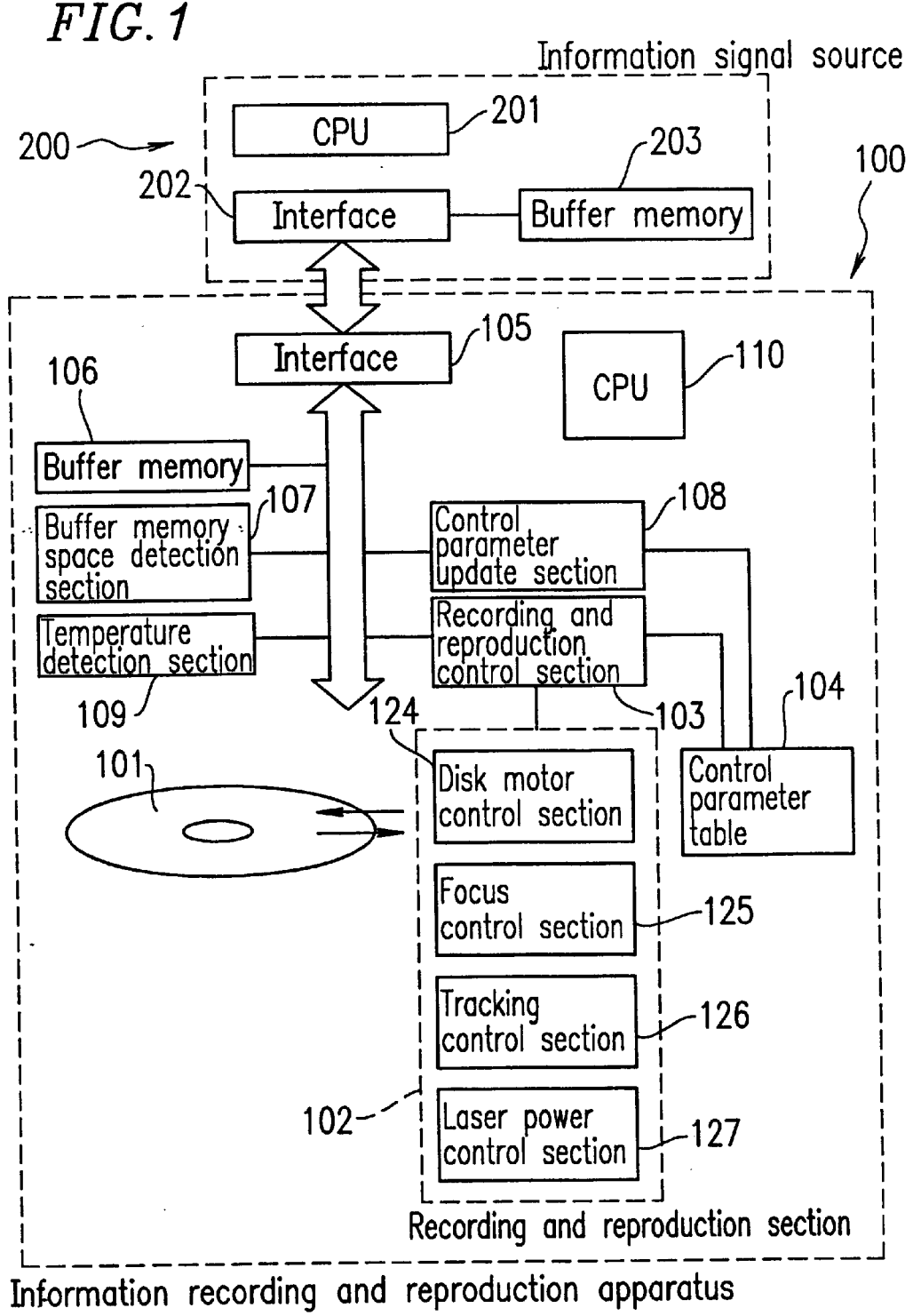
FIG. 1 is a block diagram showing an information recording and reproduction apparatus and an information signal source according to Example 1 of the present invention.

An exemplary recording and reproduction apparatus for an optical disk according to Example 1 of the present invention will be described. FIG. 1 is a block diagram showing an information recording and reproduction apparatus 100 and an information signal source 200 according to Example 1. The information recording and reproduction apparatus 100 includes a recording and reproduction section 102 for recording and reproducing an information signal to and from an optical disk 101, a recording and reproduction control section 103 for controlling the recording and reproduction section 102 based on a control parameter table 104, an interface 105 connected to the information signal source 200, a buffer memory 106 connected to the interface 105 and used to temporarily store the information signal, a buffer memory space detection section 107 for detecting a space of the buffer memory 106, and a control parameter update section 108 for updating the control parameter table 104 based on the space detected by the buffer memory space detection section 107. The recording and reproduction section 102 includes a disk motor control section 124, a focus control section 125, a tracking control section 126, and a laser power control section 127. The information recording and reproduction apparatus 100 further includes a temperature detection section 109 for detecting an ambient temperature of the recording and reproduction section 102. The information recording and reproduction apparatus 100 further includes a CPU 110 for controlling the recording and reproduction section 102, the recording and reproduction control section 103, the interface 105, the buffer memory 106, the buffer memory space detection section 107, and the control parameter update section 108. The control parameter update section 108 obtains an optimal value of a control parameter in the control parameter table 104 based on the temperature detected by the temperature detection section 109, and updates the control parameter table 104.

The information signal source 200 includes an interface 202, a buffer memory 203, and a CPU 201 for controlling operations of the interface 202 and the buffer memory 203. The information signal source 200 may be a host computer, for example. The information signal source 200 may be a video cassette recorder or a mini-disc recorder, for example. An information signal may include video data, for example.

FIG. 2 is a diagram used for explaining the control parameter table 104 of Example 1. The control parameter table 104 includes a focus position control parameter 131, a circuit offset parameter 132, and a laser output control parameter 133. Each parameter includes parameters corresponding to temperature T1, temperature T2 and temperature T3. For example, the focus position control parameter 131 includes parameters P11, P12 and P13 corresponding to the temperature T1, the temperature T2 and the temperature T3, respectively. The circuit offset parameter 132 includes parameters P21, P22 and P23 corresponding to the temperature T1, the temperature T2 and the temperature T3, respectively. The laser output control parameter 133 includes parameters P31, P32 and P33 corresponding to the temperature T1, the temperature T2 and the temperature T3, respectively.

Figure 3:
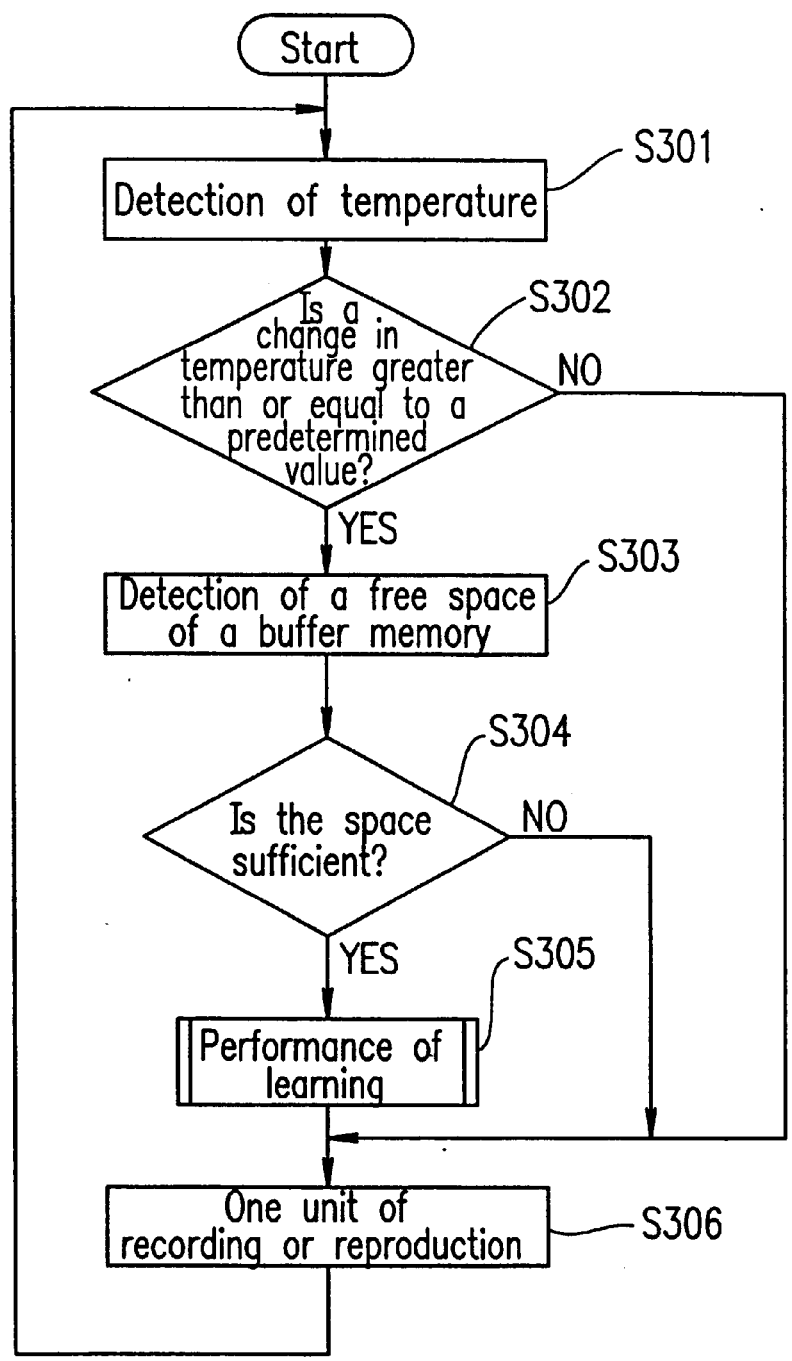
FIG. 3 is a flowchart showing a recording operation of the information recording and reproduction apparatus of Example 1.
Figure 4:
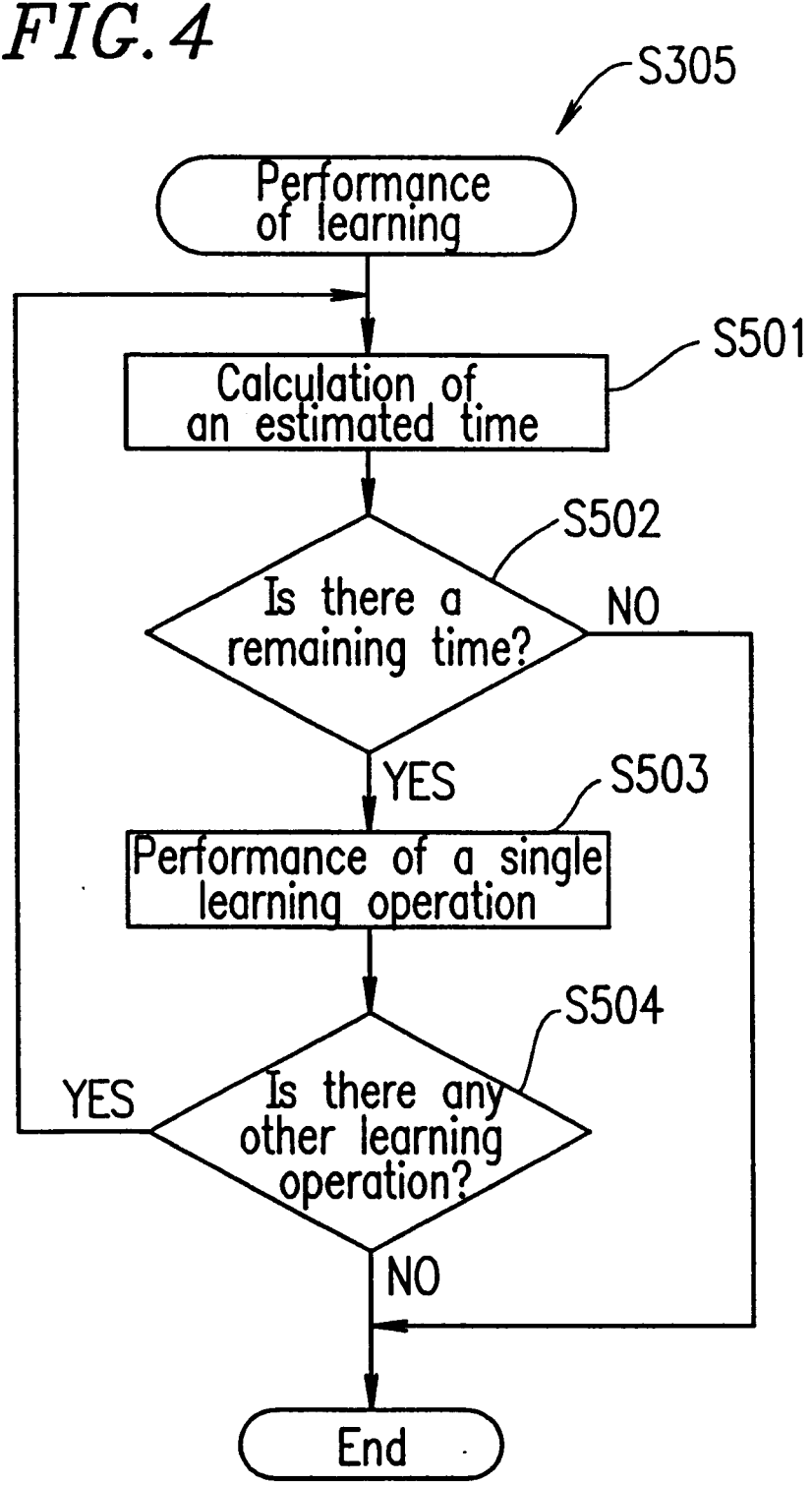
FIG. 4 is a flowchart showing a learning operation of the information recording and reproduction apparatus of Example 1.

FIG. 3 is a flowchart showing a recording operation of the information recording and reproduction apparatus 100 of Example 1. FIG. 4 is a flowchart showing a learning operation of the information recording and reproduction apparatus 100 of Example 1.

As described above, the term "learning" herein means that an optimal value of a control parameter is obtained by evaluating recording and reproduction performances while changing the control parameter. A learning operation in the information recording and reproduction apparatus 100 of Example 1 includes a focus position control parameter learning operation in which the control parameter update section 108 updates the focus position control parameter 131, a circuit offset parameter learning operation in which the control parameter update section 108 updates the circuit offset parameter 132, and a laser output control parameter learning operation in which the control parameter update section 108 updates the laser output control parameter 133.

An operation of the information recording and reproduction apparatus 100 of Example 1 will be described with reference to FIGS. 1 and 3. The temperature detection section 109 detects an ambient temperature of the recording and reproduction section 102 (S301). The CPU 110 determines whether the ambient temperature of the recording and reproduction section 102 has been changed by a predetermined value or more, based on the temperature detected by the temperature detection section 109 (S302). When the CPU 110 determines that the ambient temperature of the recording and reproduction section 102 has been changed by the predetermined value or more (YES in S302), the buffer memory space detection section 107 detects a free space of the buffer memory 106 (S303). The CPU 110 determines whether the free space detected by the buffer memory space detection section 107 is large enough for the control parameter update section 108 to perform learning (S304).

When it is determined that the free space detected by the buffer memory space detection section 107 is large enough for the control parameter update section 108 to perform learning (YES in S304), the control parameter update section 108 performs learning in which at least one of the focus position control parameter 131, the circuit offset parameter 132 and the laser output control parameter 133 is updated (S305).

When it is determined that the ambient temperature of the recording and reproduction section 102 has not been changed by the predetermined value or more (NO in S302), when it is determined that the free space detected by the buffer memory space detection section 107 is not large enough for the control parameter update section 108 to perform learning (NO in S304), or when the control parameter update section 108 performs learning, the recording and reproduction control section 103 performs one unit of recording (S306). The process moves to S301.

In this manner, when it is determined that a free space in the buffer memory 106 is large enough for the control parameter update section 108 to perform learning, the recording and reproduction control section 103 performs one unit of recording after the control parameter update section 108 performs learning. When the free space in the buffer memory 106 is smaller than or equal to the predetermined value, learning is not performed and the recording and reproduction control section 103 immediately performs one unit of recording.

The details of the learning performed by the control parameter update section 108 included in the information recording and reproduction apparatus 100 of Example 1 will be described with reference to FIGS. 1 and 4. The control parameter update section 108 calculates a time (i.e., estimates a time) required for performance of a single learning operation (S501). The control parameter update section 108 determines whether a remaining time is longer than the estimated time (S502). When it is determined that the remaining time is longer than the estimated time (YES in S502), the control parameter update section 108 performs a single learning operation, i.e., one of the focus position control parameter learning for updating the focus position control parameter 131, the circuit offset parameter learning for updating the circuit offset parameter 132, and the laser output control parameter learning for updating the laser output control parameter 133 (S503). The control parameter update section 108 determines whether any other learning to be executed remains (S504).

When it is determined that another learning to be executed remains (YES in S504), the process moves to S501. When it is determined that the remaining time is not longer than the estimated time (NO in S502), or when it is determined that no learning operation to be executed remains (NO in S504), the process is ended.

The circuit offset parameter learning for updating the circuit offset parameter 132, the focus position control parameter learning for updating the focus position control parameter 131, and the laser output control parameter learning for updating the laser output control parameter 133, have higher precedence in this order.

Although in Example 1, the change of the temperature is detected before the free space in the buffer memory is detected, the present invention is not limited to this. The free space in the buffer memory may be detected before the change of the temperature is detected.

As described above, in the information recording and reproduction apparatus and the information recording and reproduction method of Example 1, when the free space in the buffer memory is smaller than or equal to the predetermined value, learning is not performed and recording is immediately performed. Therefore, even when the temperature is changed by the predetermined value or more, the transfer of an information signal from the information signal source is not stopped.

In Example 1, recording is described. Reproduction can be similarly described, except that information is transferred from the disk 101 to the information signal source 200, and the buffer memory space detection section 107 detects not a free space but a working space in the buffer memory 106.

EXAMPLE 2

Figure 5:
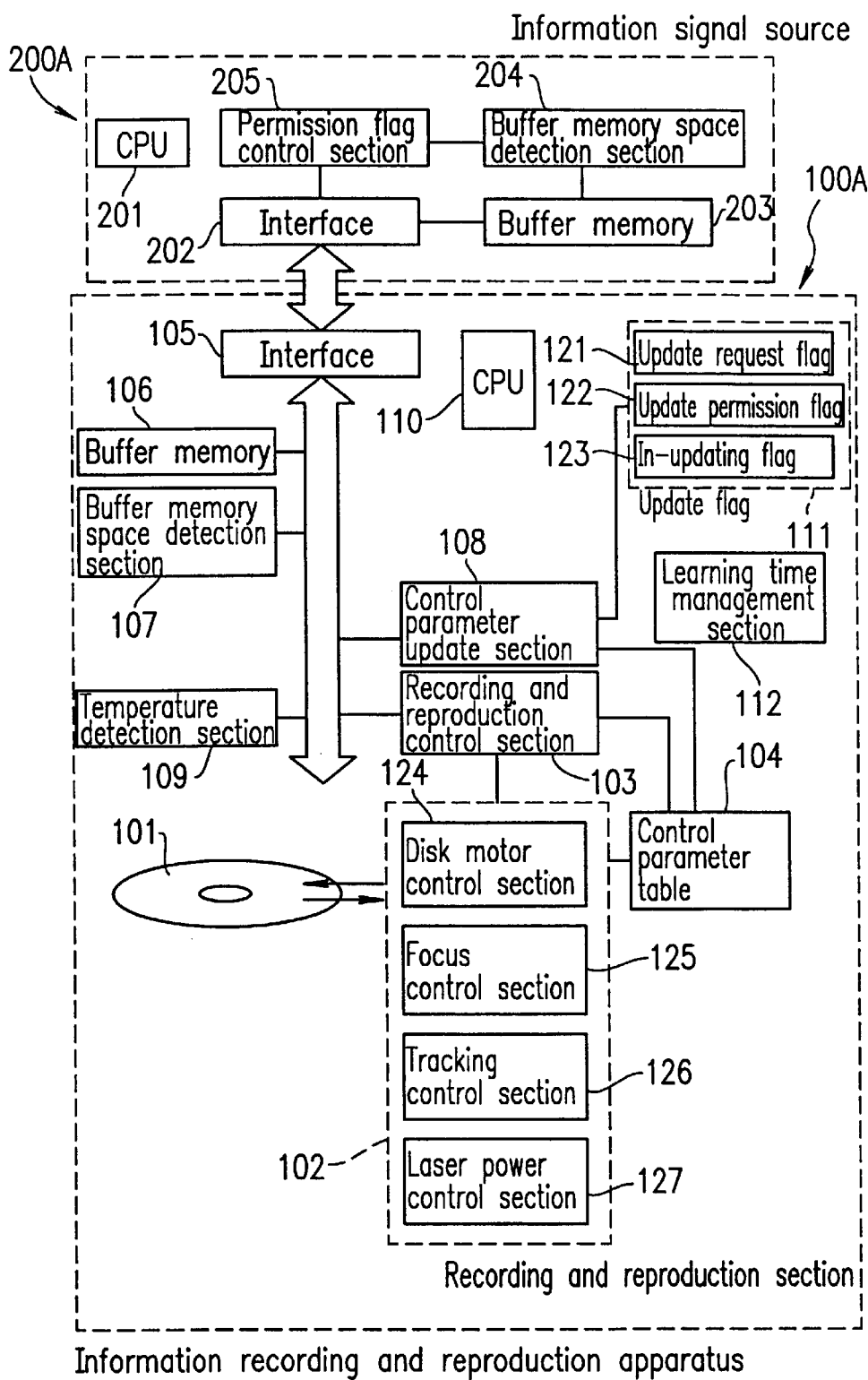
FIG. 5 is a block diagram showing an information recording and reproduction apparatus and an information signal source according to Example 2 of the present invention.

In Example 2, an exemplary recording and reproduction apparatus for an optical disk and an exemplary information signal source including a capability of recording video will be described. FIG. 5 is a block diagram showing an information recording and reproduction apparatus 100A and an information signal source 200A according to Example 2. The same components as those of the information recording and reproduction apparatus 100 and the information signal source 200 of Example 1 are referred to by the same reference numerals. Detailed description thereof is thus omitted.

The information recording and reproduction apparatus 100A includes: a recording and reproduction section 102 for recording and reproducing an information signal to and from an optical disk 101; a recording and reproduction control section 103 for controlling the recording and reproduction section 102 based on a control parameter table 104; an interface 105 connected to the information signal source 200A; an update flag section 111 including an update request flag 121 for indicating the presence or absence of a request to the information signal source 200A to update the control parameter table 104, an update permission flag 122 for indicating the presence or absence of a permission from the information signal source 200A to update the control parameter table 104 in response to the request, and an in-updating flag 123; a control parameter update section 108 for updating the control parameter table 104; a temperature detection section 109 for detecting an ambient temperature of the recording and reproduction section 102; a learning time management section 112; a buffer memory 106 connected to the interface 105 and used to temporarily store the information signal; and a buffer memory space detection section 107 for detecting a space of the buffer memory 106. The recording and reproduction section 102 includes a disk motor control section 124, a focus control section 125, a tracking control section 126, and a laser power control section 127. The information recording and reproduction apparatus 100A further includes a CPU 110 for controlling the recording and reproduction section 102, the recording and reproduction control section 103, the interface 105, the control parameter update section 108 and the temperature detection section 109.

The information signal source 200A includes an interface 202 connected to the information recording and reproduction apparatus 100A, a buffer memory 203, a buffer memory space detection section 204, a permission flag control section 205, and a CPU 201 for controlling operations of the interface 202, the buffer memory 203, the buffer memory space detection section 204, and the permission flag control section 205. The information signal source 200A may be a host computer, for example. The information signal source 200A may be a video cassette recorder or a mini-disc recorder, for example. An information signal may include video data, for example.

The control parameter update section 108 obtains an optimal value of a control parameter in the control parameter table 104 and updates the control parameter table 104 when the update request flag 121 is set and thereafter the update permission flag 122 is set by the permission flag control section 205. The recording and reproduction section 102 performs recording and reproduction based on the control parameter table 104 updated by the control parameter update section 108. The update flag section 111 sets the update request flag 121 based on the temperature detected by the temperature detection section 109.

The control parameter table 104 of Example 2 is the same as the control parameter table 104 of Example 1 described in FIG. 2. Similar to Example 1, the control parameter table 104 of Example 2 includes a focus position control parameter 131, a circuit offset parameter 132, and a laser output control parameter 133. Each parameter includes a plurality of parameters, e.g., temperature T1, temperature T2 and temperature T3. For example, the focus position control parameter 131 includes parameters P11, P12 and P13 corresponding to the temperature T1, the temperature T2 and the temperature T3, respectively. The circuit offset parameter 132 includes parameters P21, P22 and P23 corresponding to the temperature T1, the temperature T2 and the temperature T3, respectively. The laser output control parameter 133 includes parameters P31, P32 and P33 corresponding to the temperature T1, the temperature T2 and the temperature T3, respectively.

Figure 6:
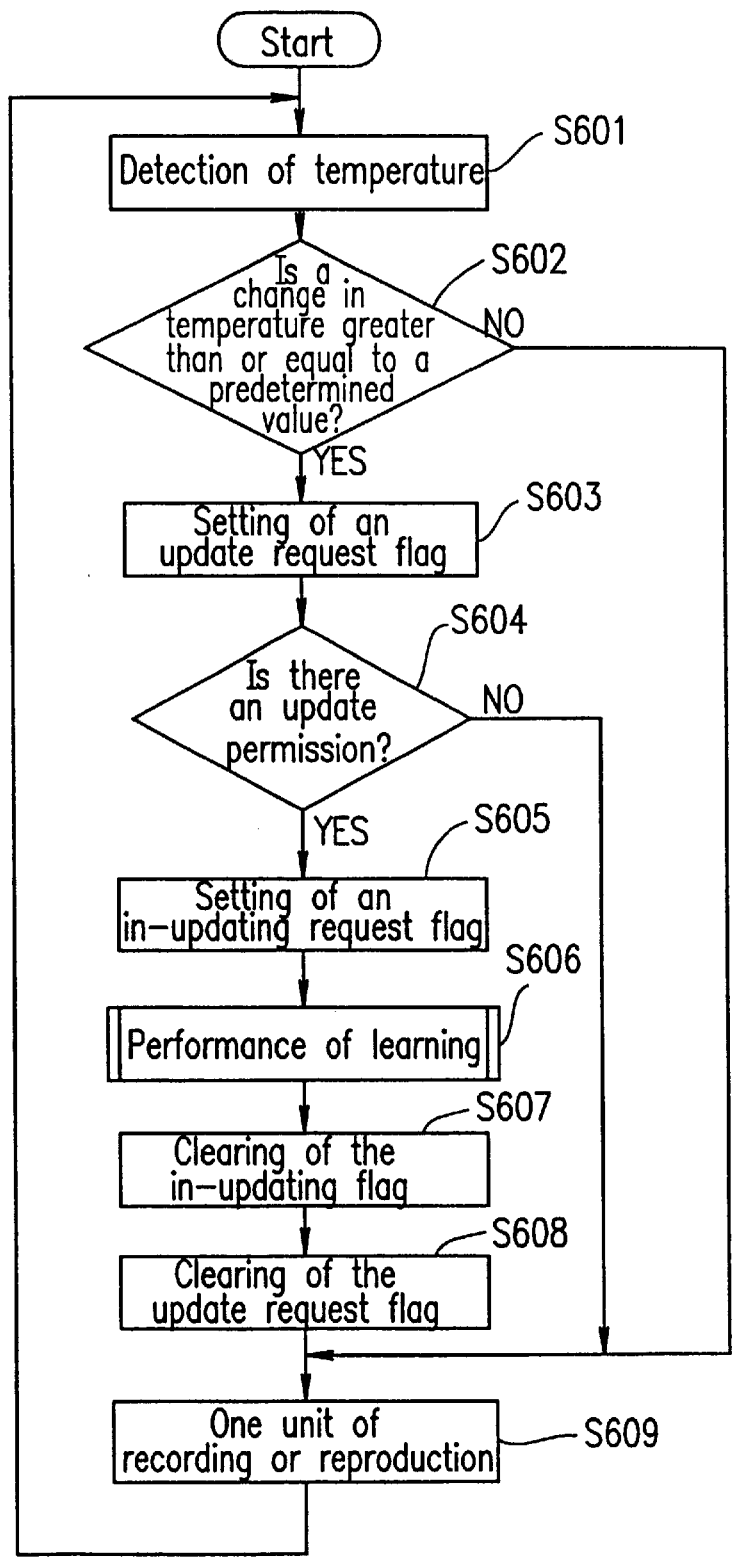
FIG. 6 is a flowchart showing a recording operation of the information recording and reproduction apparatus of Example 2.

FIG. 6 is a flowchart showing a recording operation of the information recording and reproduction apparatus 100A of Example 2.

As described in Example 1, the term "learning" herein means that an optimal value of a control parameter is obtained by evaluating recording and reproduction performances while changing the control parameter. Similar to Example 1, a learning operation in the information recording and reproduction apparatus 100A of Example 2 includes a focus position control parameter learning operation for updating the focus position control parameter 131, a circuit offset parameter learning operation for updating the circuit offset parameter 132, and a laser output control parameter learning operation for updating the laser output control parameter 133.

An operation of the information recording and reproduction apparatus 100A of Example 2 will be described with reference to FIGS. 5 and 6. The temperature detection section 109 detects an ambient temperature of the recording and reproduction section 102 (S601). The CPU 110 determines whether the ambient temperature of the recording and reproduction section 102 has been changed by a predetermined value or more, based on the temperature detected by the temperature detection section 109 (S602).

When the CPU 110 determines that the ambient temperature of the recording and reproduction section 102 has been changed by the predetermined value or more (YES in S602), the control parameter update section 108 sets the update request flag 121 (S603). The control parameter update section 108 determines whether the update permission flag 122 is set by the permission flag control section 205 included in the information signal source 200A (S604). When it is determined that the update permission flag 122 is set by the permission flag control section 205 included in the information signal source 200A (YES in S604), the control parameter update section 108 sets the in-updating flag 123 (S605). The control parameter update section 108 performs learning in which at least one of the focus position control parameter 131, the circuit offset parameter 132 and the laser output control parameter 133 is updated (S606). After the learning is ended, the control parameter update section 108 clears the in-updating flag 123 (S607) and clears the update request flag 121 (S608). When it is determined that the ambient temperature of the recording and reproduction section 102 has not been changed by a predetermined value or more (NO in S602), when the update permission flag 122 is not set by the permission flag control section 205 (NO in S604), or when the control parameter update section 108 clears the update request flag 121 (S608), the recording and reproduction control section 103 performs one unit of recording (S609). The process moves to S601.

Figure 7:
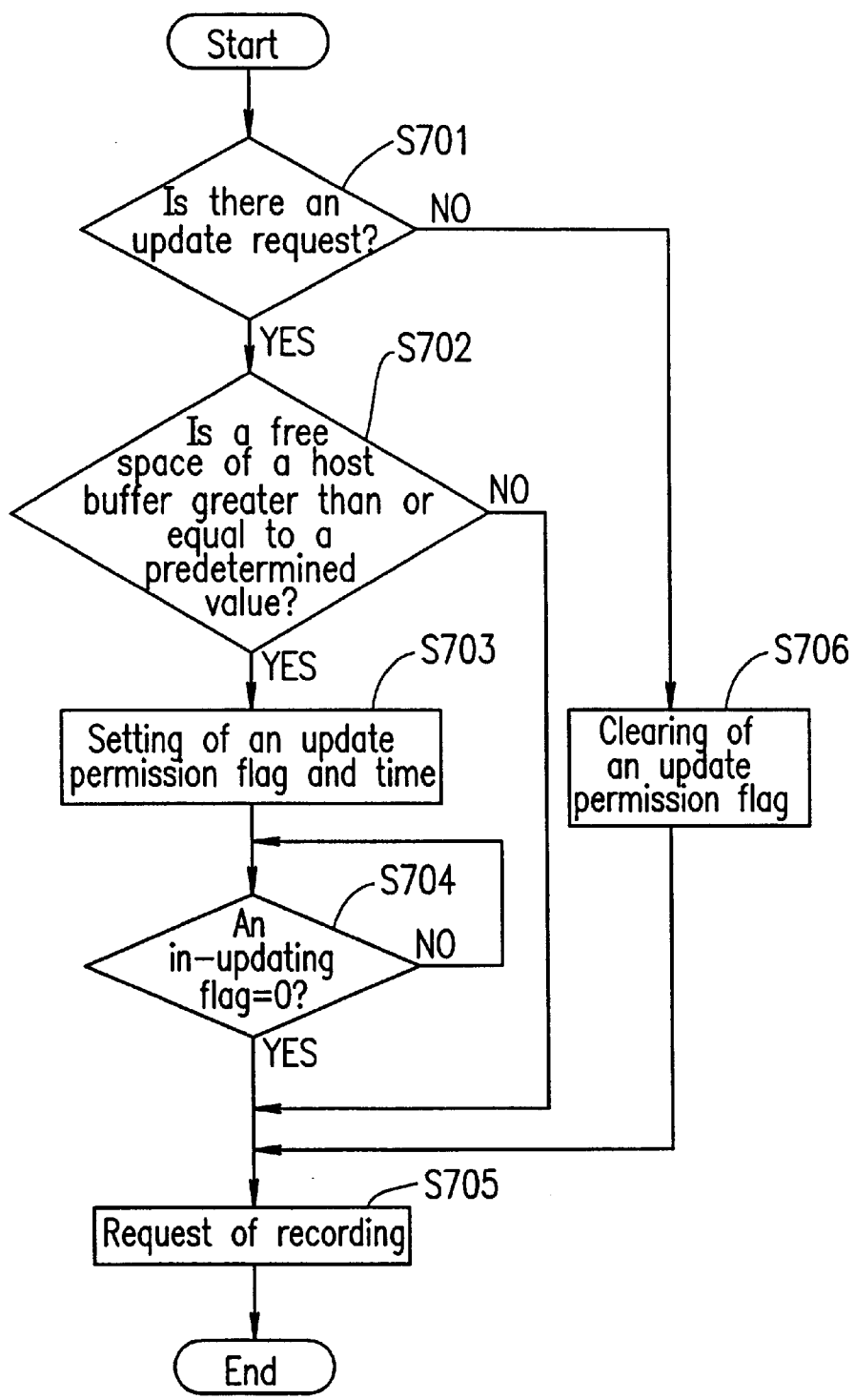
FIG. 7 is a flowchart showing an operation of the information signal source of Example 2.

FIG. 7 is a flowchart showing an operation of the information signal source 200A of Example 2. The operation of the information signal source 200A will be described with reference to FIGS. 5 and 7.

Referring to FIG. 7, the permission flag control section 205 determines whether the update request flag 121 included in the update flag section 111 has been set by the control parameter update section 108 (S701). When it is determined that the update request flag 121 included in the update flag section 111 has been set by the control parameter update section 108 (YES in S701), the buffer memory space detection section 204 detects a free space in the buffer memory. The CPU 201 determines whether the free space in the buffer memory 203 detected by the buffer memory space detection section 204 is greater than or equal to a predetermined value (S702). When it is determined that the free space in the buffer memory 203 is greater than or equal to a predetermined value (YES in S702), the permission flag control section 205 sets the update permission flag 122 and sets a permission time in the learning time management section 112 (S703). The permission time indicates a time in which the updating of the focus position control parameter 131, the circuit offset parameter 132, and the laser output control parameter 133 is permitted.

The permission flag control section 205 determines whether the in-updating flag 123 has been cleared by the control parameter update section 108 (S704). When it is determined that the in-updating flag 123 has not been cleared by the control parameter update section 108 (NO in S704), the process returns to S704.

When it is not determined that the update request flag 121 is not set (NO in S701), the permission flag control section 205 clears the update permission flag 122.

When it is determined that the in-updating flag 123 has been cleared by the control parameter update section 108 (YES in S704), when the permission flag control section 205 clears the update permission flag 122 (S706), or when it is determined that the free space in the buffer memory 203 is not greater than or equal to a predetermined value (NO in S702), the CPU 201 requests that an information signal be recorded in the recording and reproduction control section 103 included in the information recording and reproduction apparatus 100A (S705). When a large amount of information is transferred to the buffer memory 203 included in the information signal source 200A, or when the information signal source 200A performs another processing as well as the transfer of the information signal to the information recording and reproduction apparatus 100A, the free space in the buffer memory 203 may not be greater than or equal to the predetermined value (NO in S702).

Figure 8:
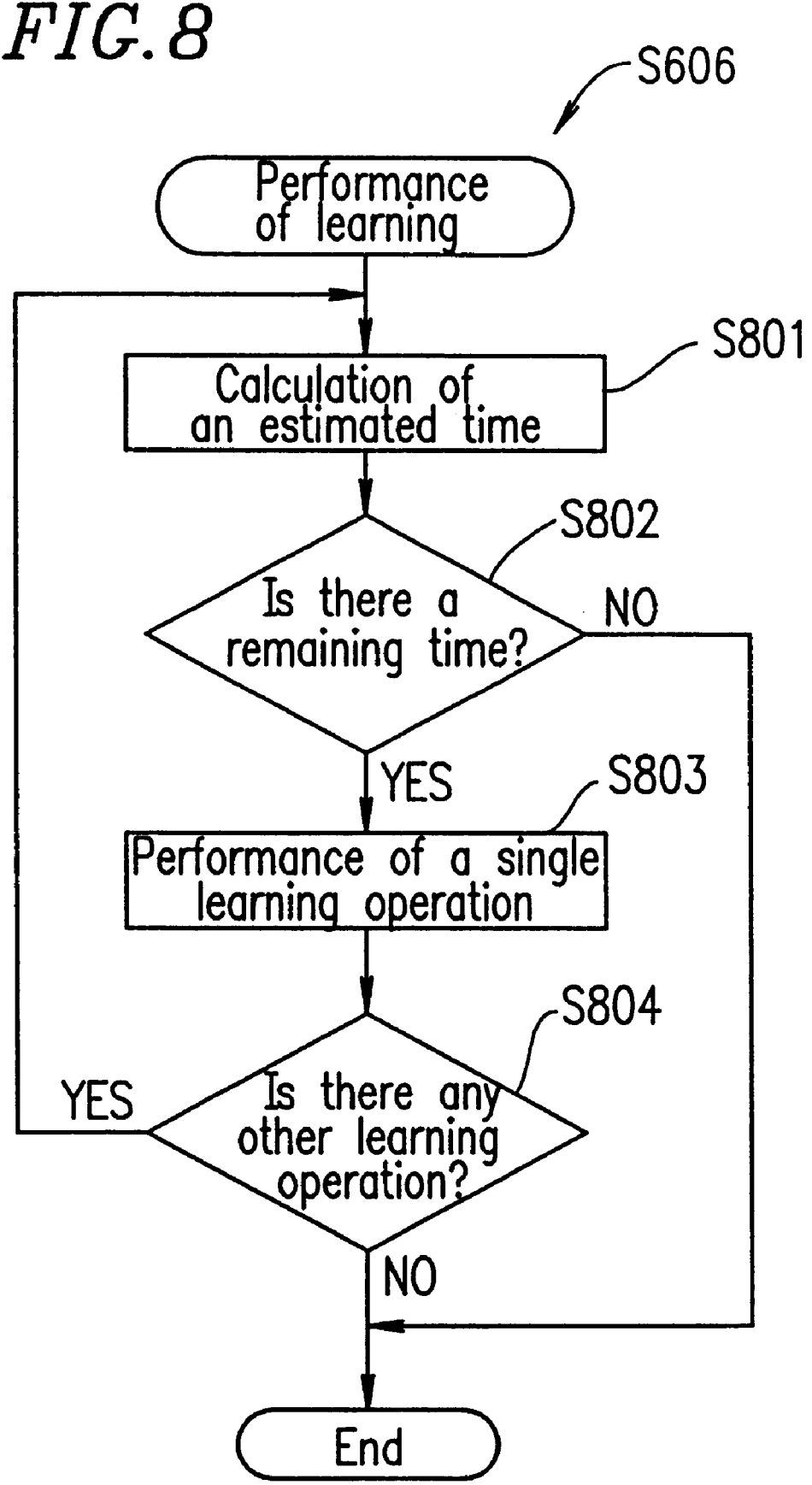
FIG. 8 is a flowchart showing a learning operation of the information recording and reproduction apparatus of Example 2.

FIG. 8 is a flowchart showing a learning operation of the information recording and reproduction apparatus 100A of Example 2. The flowchart of FIG. 8 shows the details of the processing in S606 included in the flowchart of FIG. 6. The flowchart of FIG. 8 is substantially the same as the flowchart showing the learning operation of the information recording and reproduction apparatus 100 of Example 1 described in FIG. 4.

The details of the learning performed by the control parameter update section 108 included in the information recording and reproduction apparatus 100A of Example 2 will be described with reference to FIGS. 5 and 8. The control parameter update section 108 calculates a time (i.e., estimates a time) required for performance of a single learning operation (S801). The control parameter update section 108 determines whether a remaining time is longer than the estimated time (S802). When it is determined that the remaining time is longer than the estimated time (YES in S802), the control parameter update section 108 performs a single learning operation (S803). The control parameter update section 108 updates the permission time by subtracting the estimated time from the permission time. The control parameter update section 108 determines whether any other learning to be executed remains (S804).

When it is determined that another learning to be executed remains (YES in S804), the process moves to S801. When it is determined that the remaining time is not longer than the estimated time (NO in S802), or when it is determined that no learning operation to be executed remains (NO in S804), the process is ended.

As described above, when it is determined that the free space in the buffer memory 203 is large enough to perform learning, the control parameter update section 108 performs learning. Thereafter, the recording and reproduction control section 103 performs one unit of recording. When it is determined that the free space in the buffer memory 203 is smaller than or equal to the predetermined value, the permission flag control section 205 does not set the update permission flag 122 and the control parameter update section 108 does not perform learning. The recording and reproduction control section 103 immediately performs one unit of recording.

In Example 2, when it is determined that the ambient temperature of the recording and reproduction section 102 has been changed by a predetermined value or more, the control parameter update section 108 sets the update request flag 121. The present invention is not limited to this. Those skilled in the art would understand that when a state of the recording and reproduction section 102 is changed (e.g., a parameter other than temperature is changed), the control parameter update section 108 sets the update request flag 121.

As described above, according to Example 2, when a free space in the buffer memory 203 included in the information signal source 200A is smaller than or equal to a predetermined value, the control parameter update section 108 does not perform learning. The recording and reproduction control section 103 immediately performs one unit of recording. Therefore, the transfer of an information signal from the information signal source 200A to the information recording and reproduction apparatus 100A is not stopped due to the control parameter update section 108 performing learning. Thus, in Example 2, an information signal can be continuously transferred from the information signal source 200A to the information recording and reproduction apparatus 100A while performing learning in which a control parameter is updated.

In Example 2, recording is described similar to Example 1. Reproduction can be similarly described, except that information is transferred from the disk 101 to the information signal source 200A, and the buffer memory space detection section 204 detects not a free space but a working space in the buffer memory 203.

EXAMPLE 3

An information recording and reproduction apparatus 100B and an information signal source 200B according to Example 3 will be described with reference to FIGS. 9 through 12. The same components as those of the information recording and reproduction apparatus 100A and the information signal source 200A of Example 2 are referred to by the same reference numerals. Detailed description thereof is thus omitted.

The information recording and reproduction apparatus 100B and the information signal source 200B of Example 3 differ from the information recording and reproduction apparatus 100A and the information signal source 200A of Example 2, respectively, in that the information recording and reproduction apparatus 100B includes a forbidden flag section 131 and the information signal source 200B includes a forbidden flag control section 206.

The information recording and reproduction apparatus 100B includes: a recording and reproduction section 102 for recording and reproducing an information signal to and from an optical disk 101; a recording and reproduction control section 103 for controlling the recording and reproduction section 102 based on a control parameter table 104; an interface 105 connected to the information signal source 200B; an update flag section 111 including an update request flag 121 for indicating the presence or absence of a request to the information signal source 200B to updating the control parameter table 104, an update permission flag 122 for indicating the presence or absence of a permission from the information signal source 200B to update the control parameter table 104 in response to the request, and an in-updating flag 123; a control parameter update section 108 for updating the control parameter table 104; a temperature detection section 109 for detecting an ambient temperature of the recording and reproduction section 102; a learning time management section 112; a buffer memory 106 connected to the interface 105 and used to temporarily store the information signal; and a buffer memory space detection section 107 for detecting a space of the buffer memory 106. The recording and reproduction section 102 includes a disk motor control section 124, a focus control section 125, a tracking control section 126, and a laser power control section 127. The information recording and reproduction apparatus 100B further includes a CPU 110 for controlling the recording and reproduction section 102, the recording and reproduction control section 103, the interface 105, the control parameter update section 108 and the temperature detection section 109. The information recording and reproduction apparatus 100B further includes the forbidden flag section 131 having a forbidden flag 132 for indicating the presence or absence of a permission to update the control parameter table 104.

The information signal source 200B includes an interface 202 connected to the information recording and reproduction apparatus 100B, a buffer memory 203, a buffer memory space detection section 204, a permission flag control section 205, and a CPU 201 for controlling operations of the interface 202, the buffer memory 203, the buffer memory space detection section 204, and the permission flag control section 205. The information signal source 200B further includes the forbidden flag control section 206 which sets the forbidden flag 132 included in the forbidden flag section 131. The information signal source 200B may be a host computer, for example. The information signal source 200B may be a video cassette recorder or a mini-disc recorder. An information signal may include video data.

The control parameter table 104 of Example 3 is the same as the control parameter table 104 of Example 1 described in FIG. 2. Similar to Example 1, the control parameter table 104 of Example 3 includes a focus position control parameter 131, a circuit offset parameter 132, and a laser output control parameter 133. Each parameter includes a plurality of parameters, e.g., temperature T1, temperature T2 and temperature T3, respectively. For example, the focus position control parameter 131 includes parameters P11, P12 and P13 corresponding to the temperature T1, the temperature T2 and the temperature T3, respectively. The circuit offset parameter 132 includes parameters P21, P22 and P23 corresponding to the temperature T1, the temperature T2 and the temperature T3, respectively. The laser output control parameter 133 includes parameters P31, P32 and P33 corresponding to the temperature T1, the temperature T2 and the temperature T3.

Figure 10:
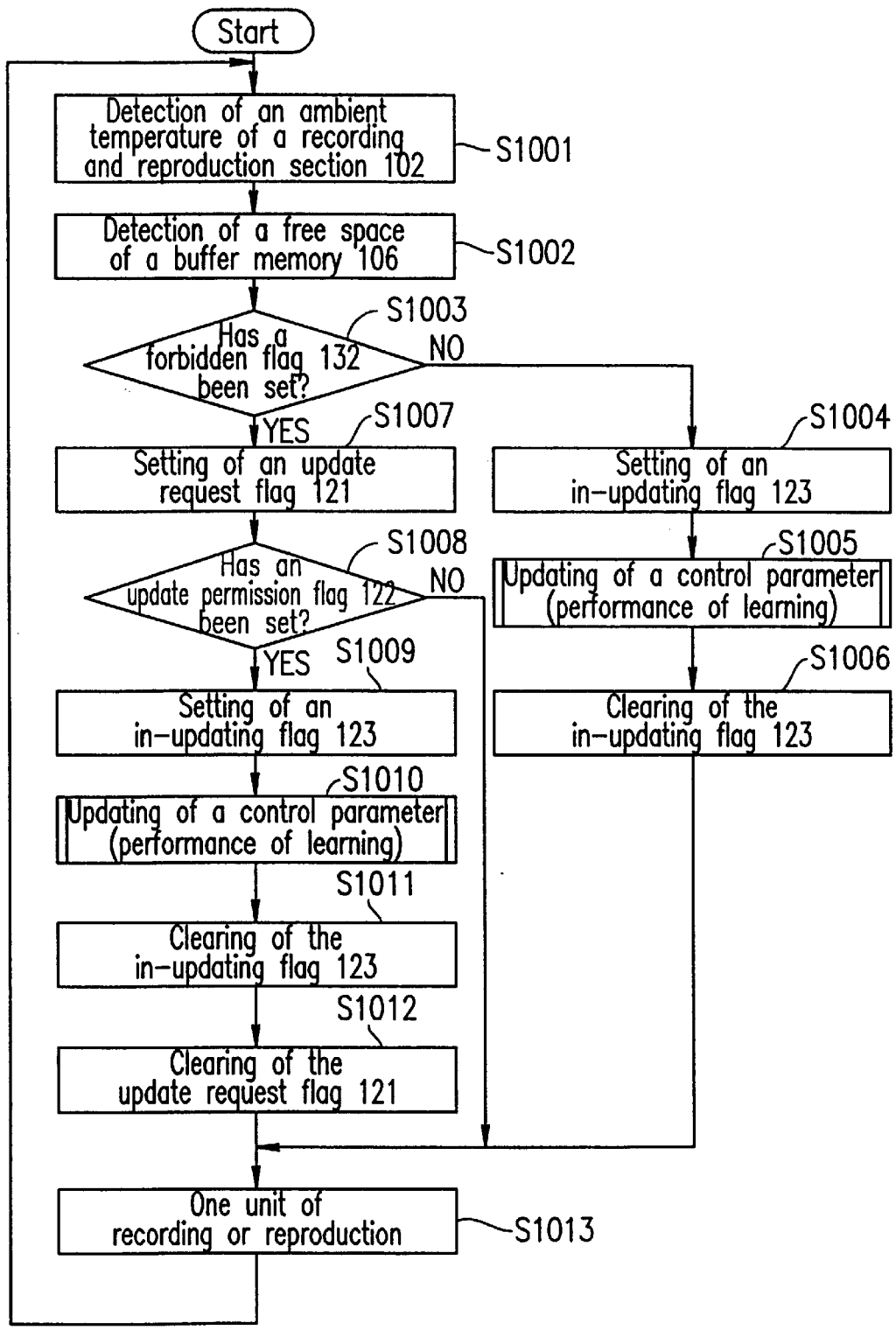
FIG. 10 is a flowchart showing a recording operation of the information recording and reproduction apparatus of Example 3.

FIG. 10 is a flowchart showing a recording operation of the information recording and reproduction apparatus 100B of Example 3.

As described in Examples 1 and 2, the term "learning" herein means that an optimal value of a control parameter is obtained by evaluating recording and reproduction performances while changing the control parameter. Similar to Examples 1 and 2, a learning operation in the information recording and reproduction apparatus 100B of Example 3 includes a focus position control parameter learning operation for updating the focus position control parameter 131, a circuit offset parameter learning operation for updating the circuit offset parameter 132, and a laser output control parameter learning operation for updating the laser output control parameter 133.

Figure 9:
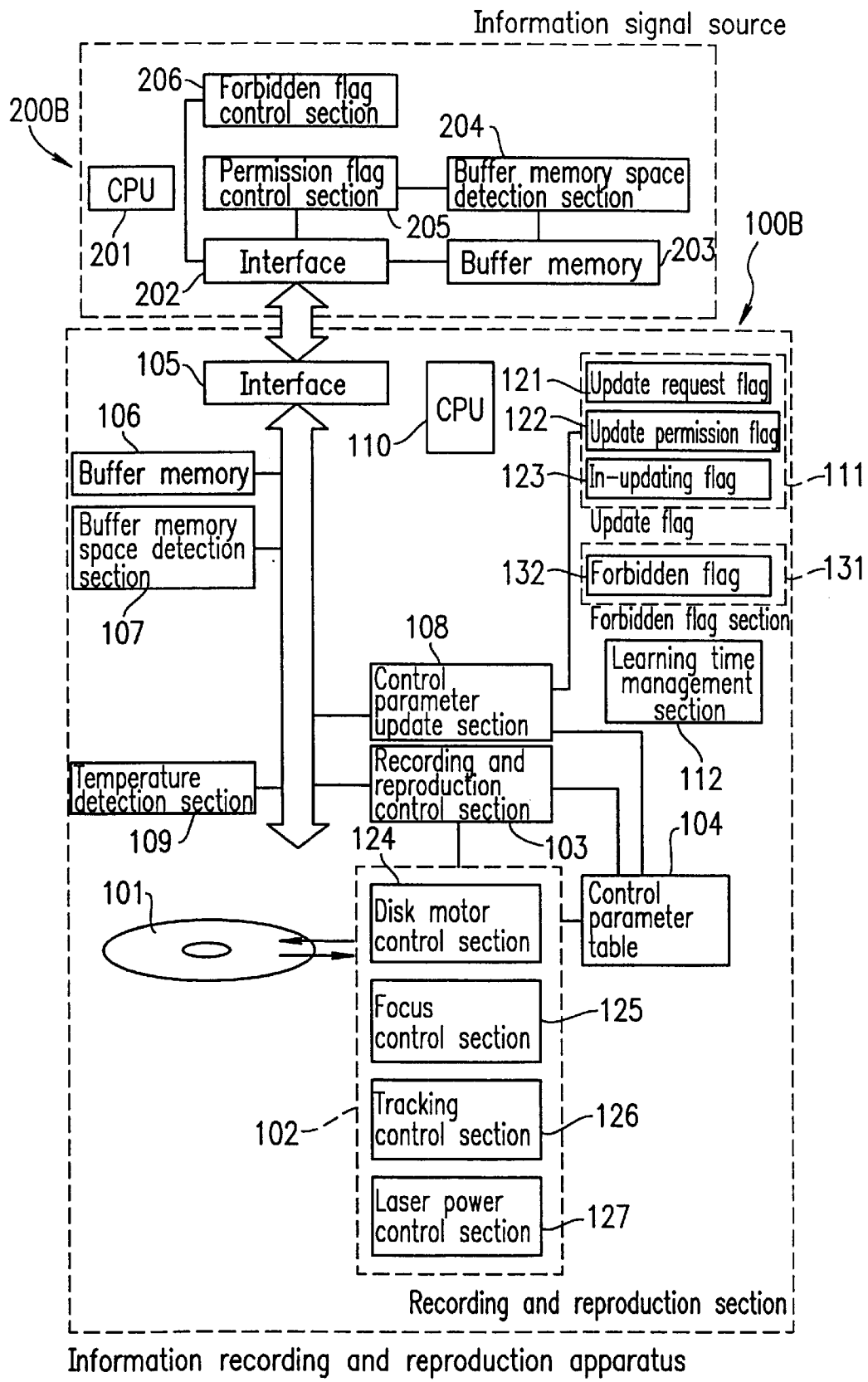
FIG. 9 is a block diagram showing an information recording and reproduction apparatus and an information signal source according to Example 3 of the present invention.

An operation of the information recording and reproduction apparatus 100B of Example 3 will be described with reference to FIGS. 9 and 10. The temperature detection section 109 detects an ambient temperature of the recording and reproduction section 102 (S1001). The buffer memory space detection section 107 detects a free space of the buffer memory 106 (S1002). The CPU 110 determines whether the forbidden flag 132 has been set by the forbidden flag control section 206 included in the information signal source 200B (S1003).

When it is determined that the forbidden flag 132 has been set by the forbidden flag control section 206 included in the information signal source 200B (YES in S1003), the control parameter update section 108 sets the update request flag 121 based on the ambient temperature of the recording and reproduction section 102 detected by the temperature detection section 109 (S1007). The control parameter update section 108 determines whether the update permission flag 122 has been set by the permission flag control section 205 (S1008). When it is determined that the update permission flag 122 has been set by the permission flag control section 205 (YES in S1008), the control parameter update section 108 sets the in-updating flag 123 (S1009). The control parameter update section 108 performs learning in which at least one of the focus position control parameter 131, the circuit offset parameter 132 and the laser output control parameter 133 is updated (S1010). After the learning is ended, the control parameter update section 108 clears the in-updating flag 123 (S1011) and clears the update request flag 121 (S1012).

When it is determined that the forbidden flag 132 has not been set by the forbidden flag control section 206 included in the information signal source 200B (NO in S1003), the control parameter update section 108 sets the in-updating flag 123 (S1004). The control parameter update section 108 performs learning in which at least one of the focus position control parameter 131, the circuit offset parameter 132 and the laser output control parameter 133 is updated (S1005). After the learning is ended, the control parameter update section 108 clears the in-updating flag 123 (S1006).

When the control parameter update section 108 clears the in-updating flag 123 (S1006), when it is determined that the update permission flag 122 has not been set by the permission flag control section 205 (NO in S1008), or when the control parameter update section 108 clears the update request flag 121 (S1012), the recording and reproduction control section 103 performs one unit of recording (S1013). The process returns to S1001.

Figure 11:
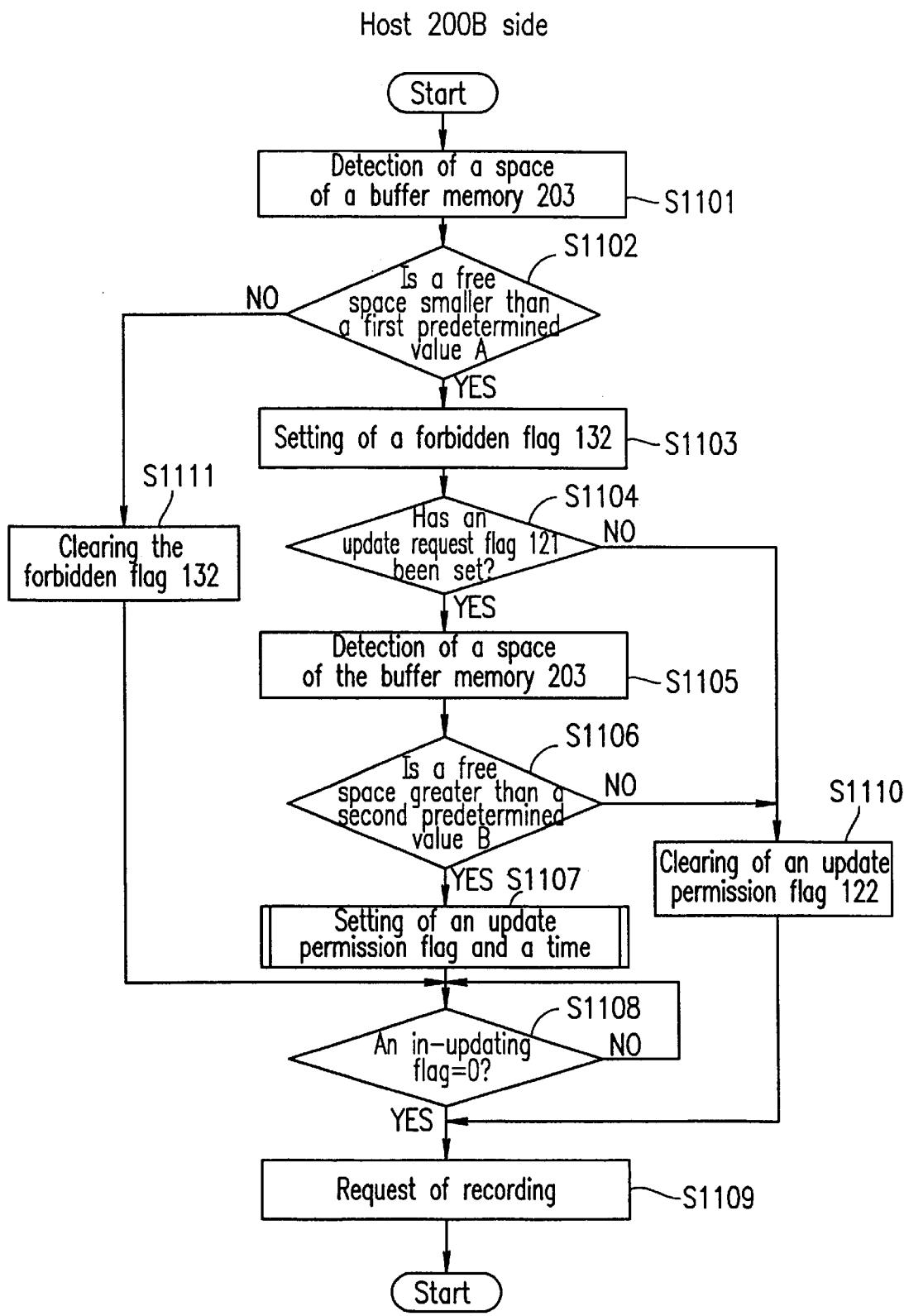
FIG. 11 is a flowchart showing an operation of the information signal source of Example 3.

FIG. 11 is a flowchart showing an operation of the information signal source 200B of Example 3. An operation of the information signal source 200B of Example 3 will be described with reference to FIGS. 9 and 11.

The buffer memory space detection section 204 detects a free space of the buffer memory 203 (S1101). The CPU 201 determines whether the free space 203 detected by the buffer memory space detection section 204 is smaller than a first predetermined value A (S1102). When it is determined that the free space 203 detected by the buffer memory space detection section 204 is smaller than a first predetermined value A (YES in S1102), the forbidden flag control section 206 sets the forbidden flag 132 included in the forbidden flag section 131 (S1103).

The CPU 201 determines whether the update request flag 121 included in the update flag section 111 has been set by the control parameter update section 108 (S1104). When it is determined that the update request flag 121 included in the update flag section 111 has been set by the control parameter update section 108 (YES in S1104), the buffer memory space detection section 204 detects a free space of the buffer memory 203 (S1105). The CPU 201 determines whether the free space in the buffer memory 203 detected by the buffer memory space detection section 204 is greater than a second predetermined value B (S1106). When it is determined that the free space in the buffer memory 203 detected by the buffer memory space detection section 204 is greater than a second predetermined value B (YES in S1106), the permission flag control section 205 sets the update permission flag 122 and sets a permission time in the learning time management section 112 (S1107). The permission time indicates a time in which the updating of the focus position control parameter 131, the circuit offset parameter 132, and the laser output control parameter 133 is permitted.

When it is determined that the free space 203 detected by the buffer memory space detection section 204 is not smaller than the first predetermined value A (NO in S1102), the forbidden flag control section 206 clears the forbidden flag 132 included in the forbidden flag section 131 (S1111). When the forbidden flag control section 206 clears the forbidden flag 132 included in the forbidden flag section 131 (S1111), or when the permission flag control section 205 sets the update permission flag 122 (S1107), the CPU 201 determines whether the in-update flag 123 has been cleared (S1108). When it is determined that the in-update flag 123 has not been cleared (NO in S1108), the process returns to S1108.

When it is determined that the update request flag 121 included in the update flag section 111 has not been set by the control parameter update section 108 (NO in S1104), or when it is determined that the free space in the buffer memory 203 detected by the buffer memory space detection section 204 is not greater than a second predetermined value B (NO in S1106), the permission flag control section 205 clears the update permission flag 122 (S1110).

When the permission flag control section 205 clears the update permission flag 122 (S1110), or when it is determined that the in-update flag 123 has been cleared (YES in S1108), the CPU 201 requests of the recording and reproduction control section 103 included in the information recording and reproduction apparatus 100B that an information signal be recorded (S1109).

Figure 12:
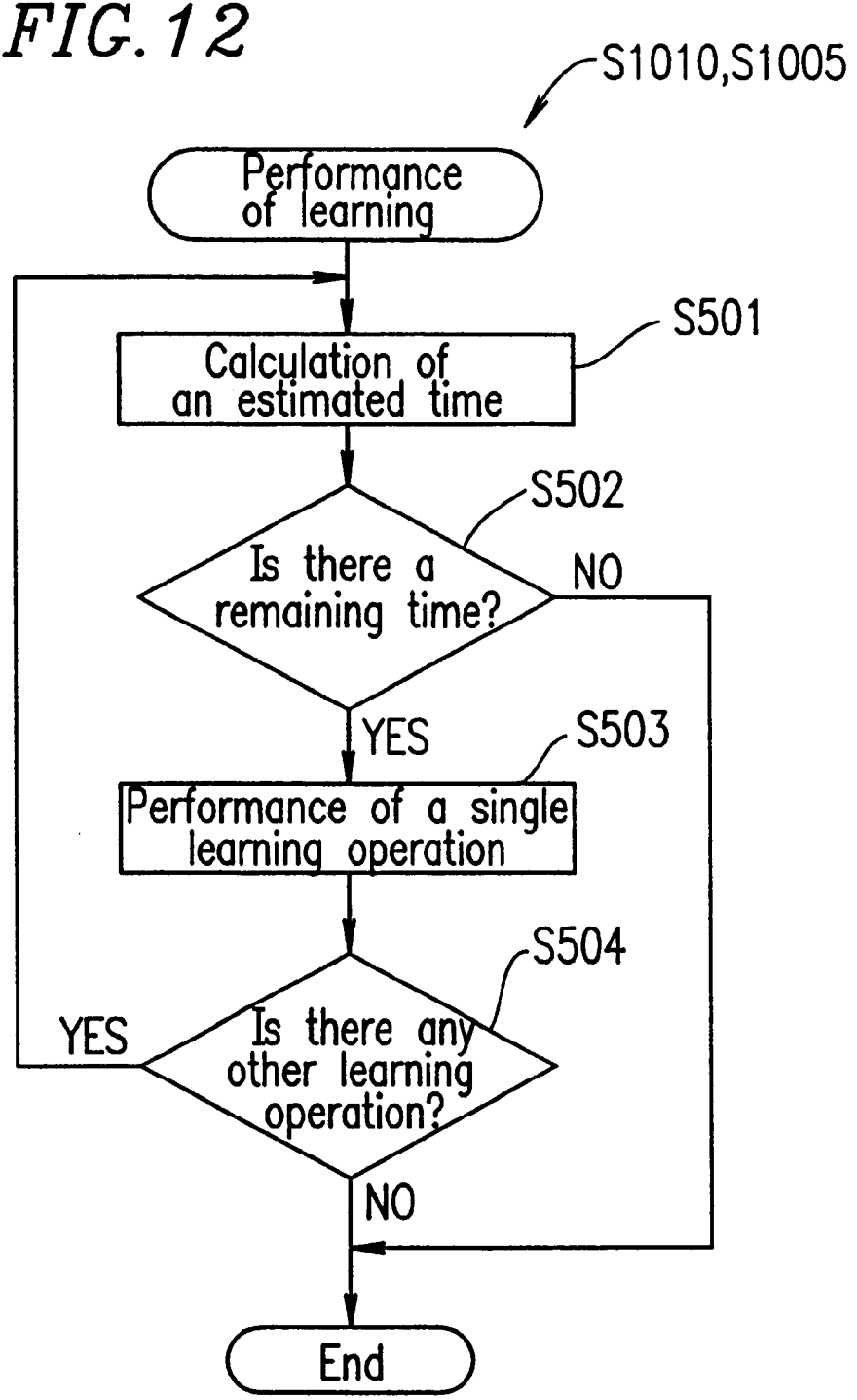
FIG. 12 is a flowchart showing a learning operation of the information recording and reproduction apparatus of Example 3.

FIG. 12 is a flowchart showing an operation of the information recording and reproduction apparatus 100B of Example 3. The flowchart of FIG. 12 shows the details of the processing in S1010 or S1005 included in the flowchart of FIG. 10. The flowchart of FIG. 12 is substantially the same as the flowchart showing the learning operation of the information recording and reproduction apparatus 100 of Example 1 described in FIG. 4. Detailed description thereof is thus omitted.

When a free space of the buffer memory 203 included in the information signal source 200B is greater than or equal to the first predetermined value A, the forbidden flag control section 206 does not set the forbidden flag 132. Therefore, learning is not forbidden in the information recording and reproduction apparatus 100B. When a free space of the buffer memory 203 included in the information signal source 200B is smaller than the first predetermined value A, the forbidden flag control section 206 sets the forbidden flag 132. Therefore, learning is forbidden in the information recording and reproduction apparatus 100B.

When learning is forbidden in the information recording and reproduction apparatus 100B since a free space of the buffer memory 203 included in the information signal source 200B is smaller than the first predetermined value A, the information recording and reproduction apparatus 100B may request a permission to perform learning. Even when the permission to perform learning is requested by the information recording and reproduction apparatus 100B, if the free space of the buffer memory 203 included in the information signal source 200B is smaller than the second predetermined value B, the permission flag control section 205 does not set the update permission flag 122. Therefore, learning is forbidden in the information recording and reproduction apparatus 100B. When the permission to perform learning is requested by the information recording and reproduction apparatus 100B, if the free space of the buffer memory 203 included in the information signal source 200B is greater than or equal to the second predetermined value B, the permission flag control section 205 sets the update permission flag 122. Therefore, learning is permitted in the information recording and reproduction apparatus 100B. The first and second predetermined values A and B satisfy the following relationship:

(the first predetermined value A)≧(the second predetermined value B).

Example 2 shows an exemplary information signal source including the buffer memory space detection section 204. Example 3 shows an exemplary information signal source including both the buffer memory space detection section 204 and the forbidden flag control section 206. The present invention is not limited to these. The information signal sources should include at least one of the buffer memory space detection section 204 for detecting a space of the buffer memory 203 and the forbidden flag control section 206 for setting the forbidden flag 132. The information signal sources may include only the forbidden flag control section 206 of the buffer memory space detection section 204 for detecting a space of the buffer memory 203 and the forbidden flag control section 206 for setting the forbidden flag 132.

In Example 3, recording is described similar to Examples 1 and 2. Reproduction can be similarly described, except that information is transferred from the disk 101 to the information signal source 200A, and the buffer memory space detection section 204 detects not a free space but a working space in the buffer memory 203.

In Example 3, learning is forbidden in the information recording and reproduction apparatus 100B when a free space of the buffer memory 203 included in the information signal source 200B is smaller than the first predetermined value A. Even when the permission to perform learning is requested by the information recording and reproduction apparatus 100B, if the free space of the buffer memory 203 included in the information signal source 200B is smaller than the second predetermined value B, learning is not permitted in the information recording and reproduction apparatus 100B. Therefore, an information signal can be continuously transferred between the information recording and reproduction apparatus 100B and the information signal source 200B.

In Example 3, learning is not forbidden in the information recording and reproduction apparatus 100B when a free space of the buffer memory 203 included in the information signal source 200B is greater than or equal to the first predetermined value A. When the permission to perform learning is requested by the information recording and reproduction apparatus 100B, if the free space of the buffer memory 203 included in the information signal source 200B is greater than or equal to the second predetermined value B, learning is permitted in the information recording and reproduction apparatus 100B. Therefore, an information signal can be continuously transferred between the information recording and reproduction apparatus 100B and the information signal source 200B while performing learning in which a control parameter is updated.

As described above, according to the present invention, an information recording and reproduction apparatus, an information signal source and an information recording and reproduction method can be provided, which can perform highly-reliable recording and reproduction.

Further, according to the present invention, an information recording and reproduction apparatus, an information signal source and an information recording and reproduction method can be provided, which can continuously transfer an information signal between the information recording and reproduction apparatus and a host system (information signal source).

Still further, according to the present invention, an information recording and reproduction apparatus, an information signal source and an information recording and reproduction method are provided, which can continuously transfer an information signal between the information recording and reproduction apparatus and a host system (information signal source) while performing learning for updating a control parameter.

Furthermore, an information recording and reproduction apparatus, an information signal source and an information recording and reproduction method are provided, which can request to a host system (information signal source) a permission to perform learning for updating a control parameter, and can perform learning under a control of the host system (information signal source).

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording and reproduction apparatus, comprising:

a recording and reproduction section for recording to, or reproducing from, an information medium, an information signal;

a recording and reproduction control section for controlling the recording and reproduction section based on a control parameter;

an interface connected to an information signal source, the information signal source being adapted by the interface to provide a permission to update the control parameter;

a forbidden flag section including a forbidden flag indicating the presence or absence of a permission to update the control parameter, the information signal being operative to set the forbidden flag;

a control parameter update section is adapted to update the control parameter;

a first buffer memory connected to the interface and used to temporarily store the information signal; and a first buffer memory space detection section for detecting a space of the first buffer memory, wherein:

the control parameter update section is adapted to update the control parameter in accordance with a permission to perform updating from the information signal source when the forbidden flag has been set by the information signal source;

the recording and reproduction control section is adapted to control the recording and reproduction section based on the control parameter updated by the control parameter update section; and the control parameter update section is adapted to update the control parameter based on the space detected by the first buffer memory space detection section.

2. An information recording and reproduction apparatus according to claim 1, wherein the control parameter update section is adapted to update the control parameter based on the space detected by the first buffer memory space detection section when the forbidden flag has not been set by the information signal source.

3. An information recording and reproduction apparatus according to claim 1, further comprising a temperature detection section for detecting an ambient temperature of the recording and reproduction section, wherein the control parameter update section is adapted to update the control parameter based on the ambient temperature detected by the temperature detection section when the forbidden flag has not been set by the information signal source.

4. An information recording and reproduction apparatus according to claim 1, further comprising an update flag section including an update request flag indicating the presence or absence of a request to the information signal source to update the control parameter, and an update permission flag indicating the presence or absence of a permission from the information signal source, in response to the request, to update the control parameter, wherein:

the control parameter update section is adapted to set the update request flag, and thereafter update the control parameter when the update permission flag has been set by the information signal source; and the recording and reproduction control section is adapted to control the recording and reproduction section based on the control parameter updated by the control parameter update section.

5. An information recording and reproduction apparatus according to claim 4, further comprising a temperature detection section for detecting an ambient temperature of the recording and reproduction section, wherein the control parameter update section is adapted to set the update request flag based on the ambient temperature detected by the temperature detection section.

6. An information recording and reproduction apparatus according to claim 4, wherein the information signal source includes at least one of a forbidden flag control section for setting the forbidden flag and a second buffer memory space detection section for detecting a space of a second buffer memory included in the information signal source, the second buffer memory temporarily storing the information signal.

7. An information signal source connected to an information recording and reproduction apparatus according to claim 4, comprising:

a second buffer memory for temporarily storing the information signal;

at least one of a second buffer memory space detection section for detecting a space of the second buffer memory and a forbidden flag control section for setting the forbidden flag; and an update permission flag control section for setting the update permission flag based on a predetermined condition.

8. An information recording and reproduction method for recording and reproducing an information signal using an information recording and reproduction apparatus according to claim 1, comprising the steps of:

a) detecting whether the forbidden flag has been set; and b) updating the control parameter in accordance with the permission to perform updating from the information signal source when it is detected in step a) that the forbidden flag has not been set.

9. An information recording and reproduction method for recording and reproducing an information signal using an information recording and reproduction apparatus according to claim 2, comprising the steps of:

a) detecting whether the forbidden flag has been set;

b) detecting a space of the first buffer memory; and c) updating the control parameter based on the space detected in step b) when it is detected in step a) that the forbidden flag has not been set.

10. An information recording and reproduction method for recording and reproducing an information signal using an information recording and reproduction apparatus according to claim 2, comprising the steps of:

a) detecting whether the forbidden flag has been set;

b) detecting a space of the first buffer memory;

c) detecting an ambient temperature of the recording and reproduction section based on the space detected in step b); and d) updating the control parameter based on the ambient temperature detected in step c) when it it detected in step a) that the forbidden flag has not been set.

11. An information recording and reproduction method for recording and reproducing an information signal using an information recording and reproduction apparatus according to claim 2, comprising the steps of:

a) detecting whether the forbidden flag has been set;

b) detecting an ambient temperature of the recording and reproduction section;

c) detecting an ambient temperature of the recording and reproduction section based on the space detected in step b); and d) updating the control parameter based on the space detected in step c) when it is detected in step a) that the forbidden flag has not been set.

12. An information recording and reproduction method for recording and reproducing an information signal using an information recording and reproduction apparatus according to claim 4, comprising the steps of:
 a) detecting whether the forbidden flag has been set;
 b) setting the update request flag when it is detected in step a) that the forbidden flag has been set;
 c) updating the control parameter when the update permission flag has been set by the information signal source; end
 d) clearing the update request flag after step c).

13. An information recording and reproduction method for recording and reproducing an information signal using an information recording and reproduction apparatus according to claim 5, comprising the steps of:
 a) detecting whether the forbidden flag has been set;
 b) detecting an ambient temperature of the recording and reproduction section;
 c) setting the update request flag based an the ambient temperature detected in step b) when it is detected in step a) that the forbidden flag has been set;
 d) updating the control parameter when the update permission flag has been set by the information signal source; and
 e) clearing the update request flag after step d).

14. An information recording and reproduction method for recording and reproducing an information signal using an information recording and reproduction apparatus according to claim 6 and an information signal source according to claim 7, comprising the steps of:
 a) setting the forbidden flag;
 b) detecting whether the update request flag has been set, when the forbidden flag has been set in step a);
 c) detecting a space of the second buffer memory if it is detected in step b) that the update request flag has been set;
 d) setting the update permission flag based on the space of the second buffer memory detected in step c); and
 e) clearing the update permission flag if it is detected in step b) that the update request flag has not been set.

* * * * *